(12) United States Patent
Morris et al.

(10) Patent No.: US 10,212,497 B2
(45) Date of Patent: Feb. 19, 2019

(54) HYBRID CIRCUIT-PACKET SWITCH

(71) Applicant: Hewlett Packard Enterprise Development LP, Houston, TX (US)

(72) Inventors: Terrel Morris, Plano, TX (US); Charles F. Clark, Roseville, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 154 days.

(21) Appl. No.: 15/028,529

(22) PCT Filed: Oct. 22, 2013

(86) PCT No.: PCT/US2013/066081
§ 371 (c)(1),
(2) Date: Jul. 1, 2016

(87) PCT Pub. No.: WO2015/060820
PCT Pub. Date: Apr. 30, 2015

(65) Prior Publication Data
US 2016/0301996 A1    Oct. 13, 2016

(51) Int. Cl.
*H04J 14/02* (2006.01)
*H04L 12/70* (2013.01)
(Continued)

(52) U.S. Cl.
CPC ......... *H04Q 11/0066* (2013.01); *H04L 47/00* (2013.01); *H04L 49/25* (2013.01);
(Continued)

(58) Field of Classification Search
CPC .......... H04Q 11/0062; H04Q 11/0066; H04Q 11/0003; H04Q 2011/0092;
(Continued)

(56) References Cited

U.S. PATENT DOCUMENTS 5,948,089 A * 9/1999 Wingard ................. G06F 13/37
                                                            710/107
6,084,864 A * 7/2000 Liron ...................... H01Q 1/242
                                                            370/316
(Continued)

FOREIGN PATENT DOCUMENTS

CN    101977152 A    2/2011
CN    102177668      9/2011
(Continued)

OTHER PUBLICATIONS

Abousamra, A., "Exploiting Properties of CMP Cache Traffic in Designing Hybrid Packet/Circuit Switched NoCs," (Research Paper), University of Pittsburgh, Jul. 15, 2013, pages, available at http://cs.pitt.edu/events/talks/2137/defense.php?id=464.
(Continued)

*Primary Examiner* — Kenneth N Vanderpuye
*Assistant Examiner* — Abbas H Alagheband
(74) *Attorney, Agent, or Firm* — Tong, Rea, Bentley & Kim, LLC

(57) ABSTRACT

A hybrid circuit-packet switch device includes a packet switch and a circuit switch. The circuit switch selectively passes, under control of a control logic, incoming data received at an optical input of the hybrid circuit-packet switch device to the packet switch or an optical output of the hybrid circuit-packet switch device.

12 Claims, 5 Drawing Sheets

(51) Int. Cl.
*H04J 14/00* (2006.01)
*H04Q 11/00* (2006.01)
*H04L 12/947* (2013.01)

(52) U.S. Cl.
CPC .......... *H04Q 11/0003* (2013.01); *H04J 14/00* (2013.01); *H04J 14/02* (2013.01); *H04Q 11/00* (2013.01); *H04Q 2011/0016* (2013.01); *H04Q 2011/0073* (2013.01); *H04Q 2213/1301* (2013.01)

(58) Field of Classification Search
CPC ... H04Q 2011/0016; H04Q 2011/0073; H04Q 2213/1301; H04L 47/00; H04L 49/25
USPC .............. 398/45, 49; 370/354, 353; 359/332
See application file for complete search history.

(56) References Cited

U.S. PATENT DOCUMENTS

| | | | | |
|---|---|---|---|---|
| 6,147,999 | A * | 11/2000 | Honda | H04M 11/002 370/396 |
| 6,512,612 | B1 * | 1/2003 | Fatehi | H04Q 11/0005 370/401 |
| 6,647,208 | B1 * | 11/2003 | Kirby | H04Q 11/0005 398/45 |
| 6,647,428 | B1 * | 11/2003 | Bannai | H04L 29/12009 370/253 |
| 6,931,002 | B1 * | 8/2005 | Simpkins | H04L 12/6402 370/354 |
| 7,266,110 | B1 * | 9/2007 | Cao | H04Q 3/54541 370/352 |
| 7,668,979 | B1 * | 2/2010 | Wentzlaff | G06F 13/4022 710/33 |
| 8,073,328 | B2 * | 12/2011 | Bjornstad | H04J 14/02 398/152 |
| 8,687,629 | B1 * | 4/2014 | Kompella | H04L 49/1515 370/386 |
| 8,774,625 | B2 * | 7/2014 | Binkert | G02B 6/356 370/216 |
| 8,842,988 | B2 * | 9/2014 | Spock | H04J 14/00 398/45 |
| 9,065,582 | B2 * | 6/2015 | Barry | H04J 14/00 |
| 9,167,322 | B1 * | 10/2015 | Zhao | H04B 10/2575 |
| 9,306,698 | B2 * | 4/2016 | Chen | H04Q 11/0005 |
| 9,596,047 | B2 * | 3/2017 | Yang | H04J 14/0256 |
| 9,634,866 | B2 * | 4/2017 | Anders | H04L 12/6418 |
| 9,699,530 | B2 * | 7/2017 | Morgan | H04J 14/00 |
| 2002/0039349 | A1 * | 4/2002 | Malaney | H04L 12/5601 370/230.1 |
| 2002/0110117 | A1 * | 8/2002 | Nishizaki | H04J 3/08 370/352 |
| 2002/0174434 | A1 * | 11/2002 | Lee | H04N 21/234327 725/74 |
| 2002/0191250 | A1 * | 12/2002 | Graves | H04Q 11/0066 398/82 |
| 2004/0052527 | A1 * | 3/2004 | Kirby | H04Q 11/0005 398/57 |
| 2007/0077998 | A1 | 4/2007 | Petrisor | |
| 2007/0154137 | A1 * | 7/2007 | Mino | G02F 1/31 385/16 |
| 2010/0098091 | A1 * | 4/2010 | Suzuki | H04L 12/2898 370/400 |
| 2011/0069963 | A1 * | 3/2011 | McLaren | G02B 6/12007 398/115 |
| 2011/0103799 | A1 * | 5/2011 | Shacham | H04B 10/25 398/115 |
| 2011/0122864 | A1 * | 5/2011 | Cherifi | H04M 3/58 370/352 |
| 2011/0176804 | A1 * | 7/2011 | Blinkert | G02B 6/356 398/45 |
| 2011/0305450 | A1 * | 12/2011 | Pan | H04L 41/0663 398/8 |
| 2012/0039601 | A1 * | 2/2012 | Bjornstad | H04J 14/02 398/25 |
| 2012/0144059 | A1 * | 6/2012 | Wander | H04J 3/07 709/233 |
| 2012/0148242 | A1 * | 6/2012 | Chen | H04J 14/0254 398/49 |
| 2012/0251109 | A1 * | 10/2012 | Mori | H04Q 11/0005 398/51 |
| 2012/0321309 | A1 * | 12/2012 | Barry | H04J 14/00 398/51 |
| 2012/0321310 | A1 * | 12/2012 | Spock | H04J 14/00 398/59 |
| 2013/0103818 | A1 * | 4/2013 | Koponen | G06F 9/45558 709/223 |
| 2013/0108259 | A1 * | 5/2013 | Srinivas | H04Q 3/0083 398/25 |
| 2013/0259465 | A1 * | 10/2013 | Blair | H04B 10/27 398/2 |
| 2014/0355977 | A1 * | 12/2014 | Bjornstad | H04Q 11/0062 398/25 |
| 2015/0023368 | A1 * | 1/2015 | Connolly | H04L 12/6402 370/420 |
| 2015/0181317 | A1 * | 6/2015 | Yin | H04Q 11/0062 398/45 |
| 2015/0237421 | A1 * | 8/2015 | Morgan | H04Q 11/0005 398/45 |
| 2015/0331831 | A1 * | 11/2015 | Solihin | H04L 49/109 709/212 |
| 2015/0373433 | A1 * | 12/2015 | McLaren | H04J 14/02 398/49 |
| 2016/0044393 | A1 * | 2/2016 | Graves | H04Q 11/0003 398/51 |

FOREIGN PATENT DOCUMENTS

| | | |
|---|---|---|
| CN | 102281478 | 12/2011 |
| JP | 07111517 A | 4/1995 |
| WO | WO-2013028479 A2 | 2/2013 |
| WO | WO-2013034200 A1 | 3/2013 |

OTHER PUBLICATIONS

Brunina, D. et al., "An Energy-Efficient Optically Connected Memory Module for Hybrid Packet-and Circuit-Switched Optical Networks," (Research Paper), Mar.-Apr. 2013, vol. 19, No. 2, 7 pages, available at http://lightwave.ee.columbia.edu/files/Brunina2012e.pdf.

Farrington, N. et al., "Helios: A Hybrid Electrical/Optical Switch Architecture for Modular Data Centers," (Research Paper), Aug. 30-Sep. 3, 2010, 12 pages, available at http://cseweb.ucsd.edu/~vahdat/papers/helios-sigcomm10.pdf.

International Search Report & Written Opinion received in PCT Application No. PCT/US2013/066081, dated Jul. 7, 2014, 11 pages.

Li, H. et al., "A Hybrid Packet-Circuit Switched Router for Optical Network on Chip," (Research Paper), Computers & Electrical Engineering 39.7, Aug. 21, 2013, pp. 2197-2206, available at http://www.sciencedirect.com/science/article/pii/S0045790613002176.

Teimouri, N. et al., "Power and Performance Efficient Partial Circuits in Packet-Switched Networks-on-Chip," (Research Paper), Feb. 27-Mar. 1, 2013, pp. 509-513, available at http://ieeexelore.ieee.org/xpl/articleDetails.jsp?tp=&arnumber=6498598&queryText%3DPower+and+Performance+Efficient+Partial+Circuits+in+Packet-Switched+Networks-on-Chip.

* cited by examiner

HYBRID CIRCUIT-PACKET SWITCH

BACKGROUND

To increase data throughput, optical communications networks can be deployed. An optical communication network includes optical paths (e.g. optical fibers, optical waveguides, etc.) over which optical signals can be transmitted between source and destination endpoints.

Switches are deployed in the optical communication network to route data between endpoints. Data sent by a source endpoint can be received by a switch, and the switch can route the data along a communication path to another switch or to a destination endpoint.

BRIEF DESCRIPTION OF THE DRAWINGS

Some embodiments are described with respect to the following figures.

DETAILED DESCRIPTION

Figure 1A:
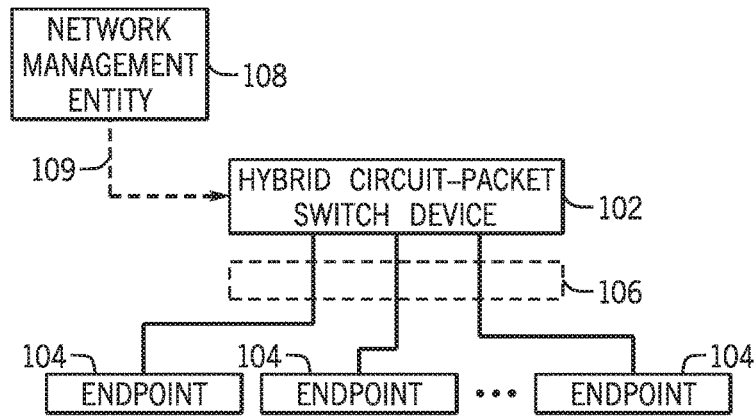
FIGS. 1A and 1B are block diagrams of example systems incorporating hybrid circuit-packet device(s) according to some implementations.

Switches used in an optical communication network can include packet switches and circuit switches. A packet switch can refer to a switch that routes packets along selected paths based on content (and more specifically, header information) contained in the packets. The header information of a packet can include a source address and a destination address. In some cases, the header information of a packet can also include a source port number and a destination port number, as well as other information. A packet switch has access to routing information (e.g., a routing table) that the packet switch can use to route an incoming packet to a selected one of multiple paths. The packet switch can perform a lookup of the routing information based on the header information to identify a target output path for the incoming packet.

In packet switching, a dedicated communication channel or circuit is not established between a source endpoint and a destination endpoint. An "endpoint" can refer to an electronic device that is able to perform communications in an optical communication network. Examples of electronic devices can include any of the following: notebook computers, desktop computers, server computers, tablet computers, smartphones, game appliances, television set top boxes, storage devices, and so forth.

Circuit switches implement circuit switching, in which a dedicated communications channel or circuit is provided in a network between a source endpoint and a destination endpoint. The dedicated circuit guarantees a specific bandwidth and quality of service for communications over the circuit. The circuit is maintained as long as a communication session is established between the source and destination endpoints.

Packet switching and circuit switching may be more efficient for different types of communications. Circuit switching may be more efficient for high-persistence traffic flows. A high-persistence traffic flow can refer to a flow of data that lasts for a relatively long period of time. Audio or video streaming is an example of a high-persistence traffic flow, since a generally continuous stream of audio data or video data is transferred from a source endpoint to a destination endpoint. With circuit switching, this high-persistence traffic flow can be more efficiently transferred over the dedicated circuit, which reduces latency and power consumption.

However, circuit switching may not be efficient for bursty traffic that can change over time. Bursty traffic refers to a data transfer that occurs in multiple bursts, in which a burst of traffic can be followed by a time interval in which there is no or reduced traffic, followed by yet another burst of traffic. Using circuit switching to transfer bursty traffic may not be efficient, since the bursty nature of the traffic may cause the circuit for circuit switching to be repeatedly setup and released. The circuit may be released if there is a relatively long time interval between traffic bursts in which no traffic is communicated. Bursty traffic may also rapidly change destinations, in which a switch would have to change connections between inputs and outputs in a short period of time. Packet switching would be more efficient for transferring bursty traffic.

Traditionally, packet switches and circuit switches of an optical communication network are distinct devices that may be housed in separate enclosures. As a result, separate components are employed for the separate packet switches and circuit switches, where such components can include cables (which can include electrical cables and optical fibers or waveguides), connectors, and other structures. The use of separate components for deploying packet switches and circuit switches in an optical communication network can increase its cost and complexity.

In accordance with some implementations, instead of using separate components for deploying packet switches and circuit switches, FIG. 1A depicts use of a hybrid circuit-packet switch device 102 according to some implementations. The hybrid circuit-packet switch device 102 is an integrated package that includes both packet switching and circuit switching functions. The hybrid circuit-packet switch 102 interconnects various endpoints 104. The endpoints 104 can include different types of devices, such as server computers, storage devices, and so forth.

By using the hybrid circuit-packet switch device 102 according to some implementations, the same set of communication paths 106 (including optical paths) can be shared for performing packet-switched communications and circuit-switched communications. An optical path can refer to an optical fiber, collection of optical fibers, an optical waveguide, a collection of optical waveguides, or any other medium or media used for propagating optical signals.

By sharing the same set of communication paths 106 for packet-switched and circuit-switched communications, separate sets of communication paths (one set of communication paths for packet-switch communications and another set of communication paths for circuit-switch communications) and associated components (such as connectors and other components) would not have to be provided.

FIG. 1A also shows a network management entity 108 that is able to control routing of data by the hybrid circuit-packet switch device 102. In some implementations, software-defined networking (SDN) can be implemented in an optical communication network. With SDN, an underlying physical network (made up of switches including the hybrid circuit-packet switch 102) can be abstracted and presented as a service to a higher-level application or network service, such as provided by the network management entity 108. The network management entity 108 can include a computer system (or multiple computer systems) on which machine-readable instructions are executable to provide SDN control of the hybrid circuit-packet switch 102.

The SDN framework effectively separates networking into a control plane and a data plane. The control plane is provided by the network management entity 108, which can control the routing of traffic through the optical communication network. The data plane is provided by the switches, including the hybrid circuit-packet switch device 102, which forward data based on control information 109 provided by the network management entity 108. The control information 109 provided by the network management entity 108 is used by the hybrid circuit-packet switch device 102 to pass data between input and output ports of the hybrid circuit-packet switch device 102.

In accordance with some implementations, the control information 109 is also used by the hybrid circuit-packet switch device 102 to determine whether any specific data is to be communicated using packet switching or circuit switching, as discussed further below.

The control information 109 provided by the network management entity 108 can be determined by an application or network service executing in the network management entity 108. Alternatively, the control information 109 provided by the network management entity 108 can be determined based on user input, such as from a network administrator (or network administrators).

FIG. 1A shows just one hybrid circuit-packet switch device 102. In alternative examples, an optical communication network can include multiple hybrid circuit-packet switch devices 102, such as in a switch cluster 110 shown in FIG. 1B. The hybrid circuit-packet switch devices 102 in the switch cluster 110 can be coupled together in a given topology, such as a tree topology or other hierarchical topology.

Figure 1B:
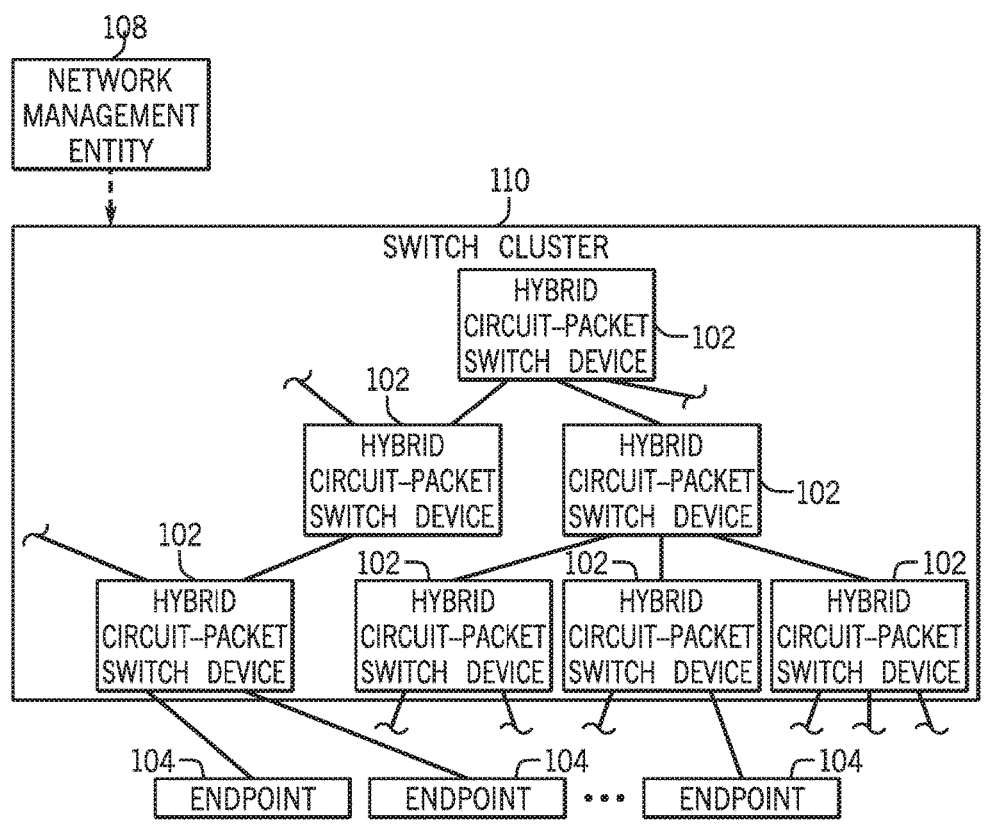

The arrangement of FIG. 1B can be used in a large data center, which can include many thousands of endpoints 104 that are to be interconnected using the switch cluster 110.

Figure 2:
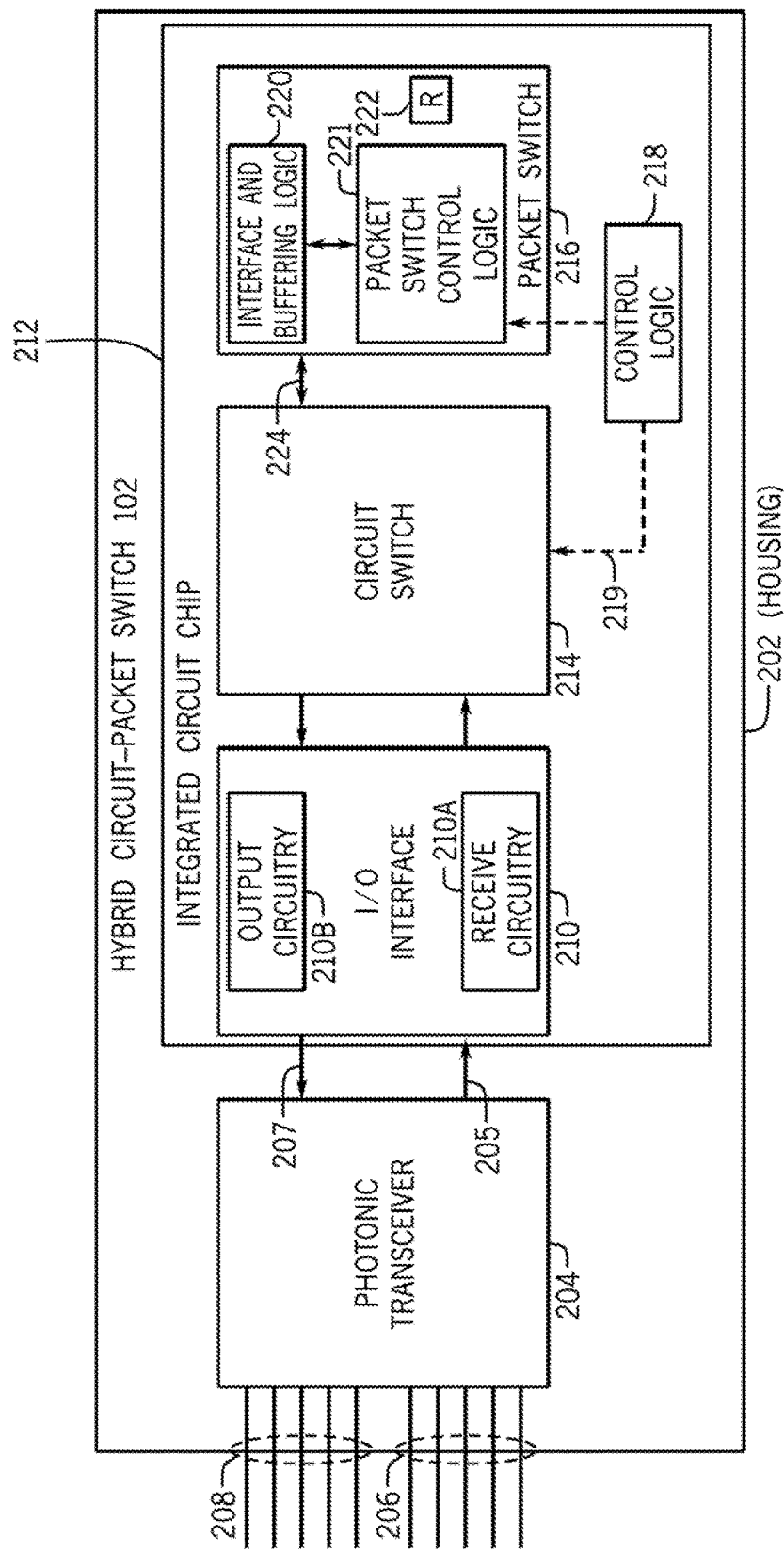
FIG. 2 is a block diagram of a hybrid circuit-packet switch device according to some implementations.

An example hybrid circuit-packet switch device 102 is shown in FIG. 2. The components depicted in FIG. 2 can be part of an integrated module included within a housing 202 of the hybrid circuit-packet switch device 102. The hybrid circuit-packet switch device 102 includes a photonic transceiver 204, which is connected to input optical ports 206 and output optical ports 208. The input optical ports 206 receive input optical signals, and the output optical ports 208 transmit output optical signals. Note that each of the ports 206 and 208 can be bi-directional (in other words, each port 206 or 208 can receive and transmit data).

The photonic transceiver 204 converts input optical signals received at the input optical ports into electrical signals 205 that can be provided to an input/output (I/O) interface 210 of an integrated circuit chip 212. The integrated circuit chip 212 can be an application-specific integrated circuit (ASIC) chip, a microcontroller, a programmable gate array (PGA), a microprocessor, and so forth. Although just one integrated circuit chip 212 is shown in FIG. 2, it is noted that the various components shown in FIG. 2 can be provided on more than one integrated circuit chip in the hybrid circuit-packet switch device 102.

The I/O interface 210 includes receive circuitry 210A to receive input electrical signals 205 from the photonic transceiver 204, and output circuitry 210B to output electrical signals 207 to the photonic transceiver 204. The photonic transceiver 204 converts the output electrical signals 207 into optical signals for transmission through output optical ports 208.

The input electrical signals 205 received by the I/O interface 210 correspond to incoming data (received by the hybrid circuit-packet switch device 102), while the output electrical signals 207 from the I/O interface 210 correspond to outgoing data (for transmission by the hybrid circuit-packet switch device 102).

Incoming data is transferred from the I/O interface 210 to a circuit switch 214, which is able to selectively pass the incoming data to a packet switch 216 or directly to the output circuitry 210B of the I/O interface 210 for output as outgoing data. It is noted that the circuit switch 214 receives incoming data without any buffering of the incoming data using buffer(s) in the hybrid circuit-packet switch device 102.

The circuit switch 214 selectively passes data to the packet switch 216 or a selected one of the multiple output optical ports 208, under control of control logic 218. The control logic 218 can provide control signals 219 that control switching elements in the circuit switch 214. The control logic 218 can be implemented with machine-readable instructions executable on processing circuitry of the integrated circuit chip 212, in some examples.

In some implementations, the control logic 218 includes SDN control logic, which cooperates with the network management entity 108 shown in FIG. 1A or 1B. As discussed above, the network management entity 108 provides control information to the hybrid circuit-packet switch device 102.

The control information from the network management entity 108 is used by the control logic 218 to configure the switching elements of the circuit switch 214 accordingly, for controlling the routing of data. Based on the control information from the network management entity 108, the control logic 218 can perform selective circuit switching and packet switching of incoming data.

Circuit switching of incoming data is performed if the circuit switch 214 passes the incoming data directly to the output circuitry 210B of the I/O interface 210. In this case, the incoming data does not pass through the packet switch 216.

However, packet switching of incoming data is performed if the circuit switch 214 passes the incoming data to the packet switch 216. The packet switch 216 can then determine an appropriate path to route the incoming data, based on header information of the incoming data (discussed further below). In further implementations, the routing of the incoming data can be based on other factors. For example, the routing of the incoming data can be based on a load balancing criterion that relates to balancing traffic load across a number of switches. As another example, the routing of the incoming data can be based a deeper inspection of the incoming data, where the routing can be based on the header information as well as on information of the incoming data that is other than header information (e.g. the payload of the incoming data).

Based on the control signals 219, the circuit switch 214 can perform circuit switching on first incoming data, and can pass second incoming data to the packet switch 216 to perform packet switching. The first incoming data can be part of a first communication session for which circuit switching is to be performed, while the second incoming data can be part of a second communication session for which packet switching is to be performed. For example, the first communication session can communicate high-persistence traffic flow, while the second communication session can communicate bursty traffic.

Since the circuit switch 214 operates under control of control signals 219 from the control logic 218, the circuit switch 214 is able to selectively pass incoming data to the packet switch or the optical output without looking at any content of the incoming data. This allows the circuit switch 214 to operate with reduced latency.

The packet switch 216 includes packet switch control logic 221 and interface and buffering logic 220. The interface and buffering logic 220 can include a gearbox and one or multiple buffers, such as first-in-first-out (FiFo) buffers. A gearbox includes interface circuitry to convert between an external data rate (more specifically, the data rate of a link 224 between the circuit switch 214 and the packet switch 216) and an internal data rate of the packet switch 216. In some examples, the data rate of data transferred over the link 224 from the circuit switch 214 to the packet switch 216 can be higher than the data rate in the packet switch 216. The buffers in the packet switch 216 are used to buffer data for processing by the packet switch control logic 221.

The packet switch control logic 221 has access to routing information 222. In some examples, the routing information 222 can be in the form of a routing table that is stored in a storage medium of the packet switch 216. The packet switch control logic 221 uses header information in each packet of incoming data to determine the output path over which the packet should be routed. For example, the header information can include a source address, a destination address, and possibly source and destination port numbers and other information. The header information can be used to perform a lookup of the routing information 222, which maps to a specific output path. As noted above, routing of a packet can also be based on other factors, such as a load balancing criterion or a deeper inspection of the packet.

In some implementations, the packet switch 216 can be dynamically allocated output optical ports of the hybrid circuit-packet switch 102. The packet switch 216 is configured to send packets out only on these allocated output optical ports, and would not output packets on other output optical ports that have been dynamically allocated to circuit switched communications. In further implementations, the packet switch 216 may also be dynamically allocated wavelengths that can be used for outputting packets from the hybrid circuit-packet switch 102. The dynamic allocation of output optical ports and/or wavelengths can be based on control information provided from the control logic 218 to the packet switch control logic 221.

Once the packet switch 216 has identified the output path to route an incoming packet, the packet is passed through the circuit switch 214 and the I/O interface 210 to the photonic transceiver 204 for transmission through a selected one of the output optical ports 208.

In some implementations, such as the implementation shown in FIG. 2, the circuit switch 214 is implemented as an electronic switch. As noted above, in such implementations, the input signals 205 and output signals 207 received by and transmitted by the circuit switch 214 are electrical signals. In addition, the control signals 219 from the control logic 218 are also electrical signals.

Figure 3:
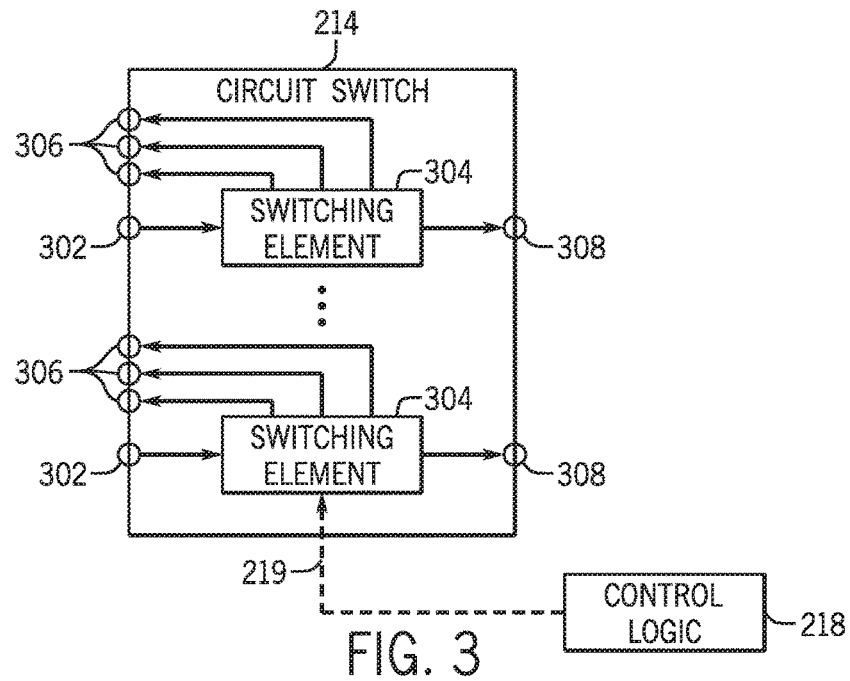
FIG. 3 is a block diagram of a circuit switch in a hybrid circuit-packet switch device according to some implementations.

FIG. 3 shows further details of the electronic circuit switch 214 of FIG. 2. The circuit switch 214 has input electrical ports 302. Incoming data received at a given input port 302 is passed to a respective one of multiple switching elements 304 in the circuit switch 214. The switching elements 304 can be controlled by control signals 219 from the control logic 218. Different control signals 219 can individually control each of the switching elements 304 in the circuit switch 214.

Each switching element 304 can be controlled to pass the incoming data to a respective one of multiple output electrical ports 306, or to a packet switch port 308. If passed to an output electrical port 306, the incoming data from an input electrical port 302 is passed as outgoing data from the circuit switch 214 to the I/O interface 210 of FIG. 2, to perform circuit switching of the incoming data that bypasses the packet switch 216.

If the incoming data is passed to a respective packet switch port 308, then the incoming data is transferred to the packet switch 216 to perform packet switching of the incoming data.

In alternative implementations, instead of using an electronic circuit switch 214 as shown in FIGS. 2 and 3, an optical circuit switch can be used instead. If an optical circuit switch is implemented, then the optical transceiver 204 and I/O interface 210 of FIG. 2 can be omitted.

Figure 4:
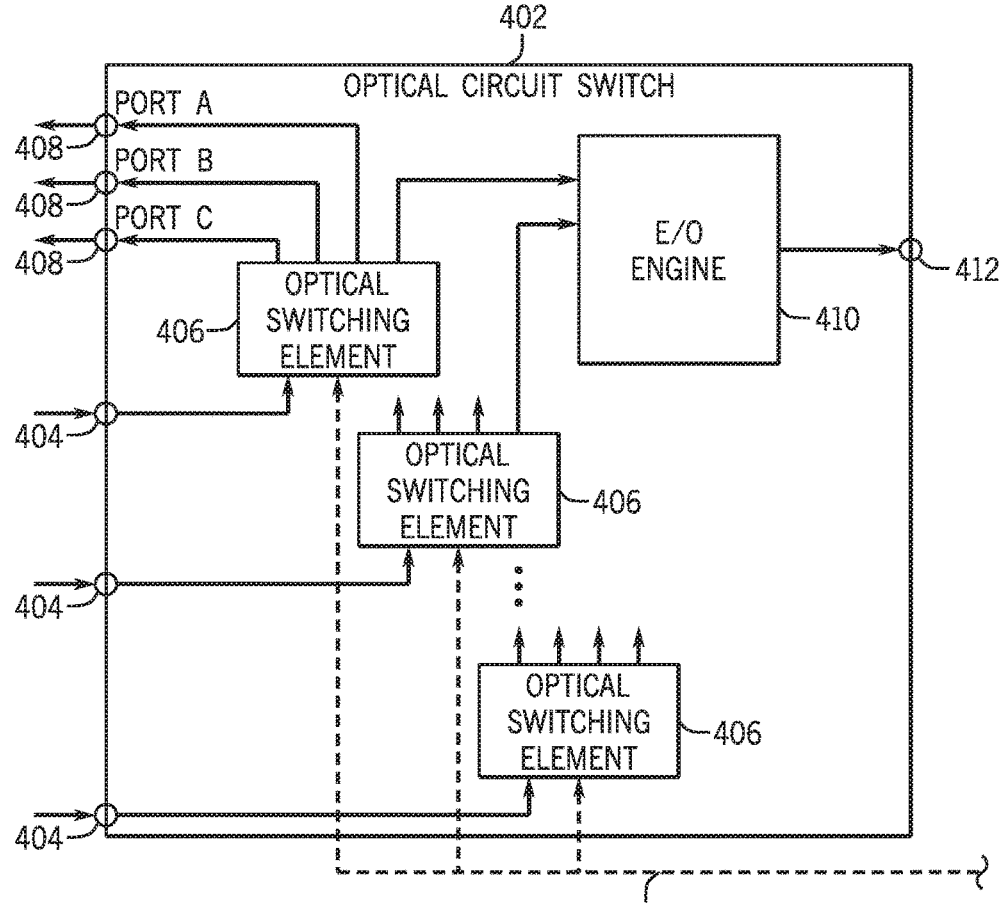
FIG. 4 is a block diagram of an optical circuit switch in a hybrid circuit-packet switch device according to further implementations.

FIG. 4 is a block diagram of an example optical (or photonic) circuit switch 402 that can be used in place of the electronic circuit switch 214 of FIG. 2. The optical circuit switch 402 receives input optical signals at input optical ports 404. Each input optical port 404 is connected to a respective one of optical switching elements 406 in the optical circuit switch 402.

An optical switching element 406 can selectively pass incoming optical data to one of four outputs of the optical switching element of 406. Three of the outputs of the optical switching element 406 are connected to respective output optical ports 408, indicated as port A, port B, and port C, respectively. The optical switching element 406 includes additional output optical ports 408 that are connected to other optical switching elements 406.

The fourth output of each optical switching element 406 is provided to a respective input of an electrical-optical (E/O) engine 410. The E/O engine 410 can convert between electrical and optical signals. An output of the E/O engine 410 is connected to a packet switch port 412 of the optical circuit switch 402. Although just one packet switch port 412 is shown, it is noted that the optical circuit switch 402 can include multiple packet switch ports 412. The packet switch ports 412 of the optical circuit switch 402 are connected to the packet switch 216 of FIG. 2, for example.

The optical switching elements 406 are controlled by control signals 219 from the control logic 218. The control signals 219 controlling the optical switching elements 406 can be electrical control signals.

Although the optical ports 404 and 408 are designated input and output optical ports in FIG. 4, it is noted that each optical port 404 or 408 can be a bi-directional optical port that allows communication in both the input and output directions. Also, each packet switch port 412 can also be a bi-directional port. For example, a packet switch port 412 can receive an electrical signal (corresponding to outgoing data), which can be converted by the E/O engine 410 into an optical signal for propagation by an optical switching element 406 to one of the optical ports 404, 408.

In some examples, each optical switching element 406 can include Mach-Zehnder Interferometer (MZI) elements.

An MZI element controls communication of an optical signal using an electro-optic effect. In some examples, an MZI element can be formed using a Lithium Niobate substrate, Silicon substrate, or other type of substrate. A voltage applied to the MZI element creates an electric field distribution within the substrate, which can cause changes in the refractive index of the substrate. An induced change in the refractive index can control coupling between an input and output of the MZI element.

Figure 5:
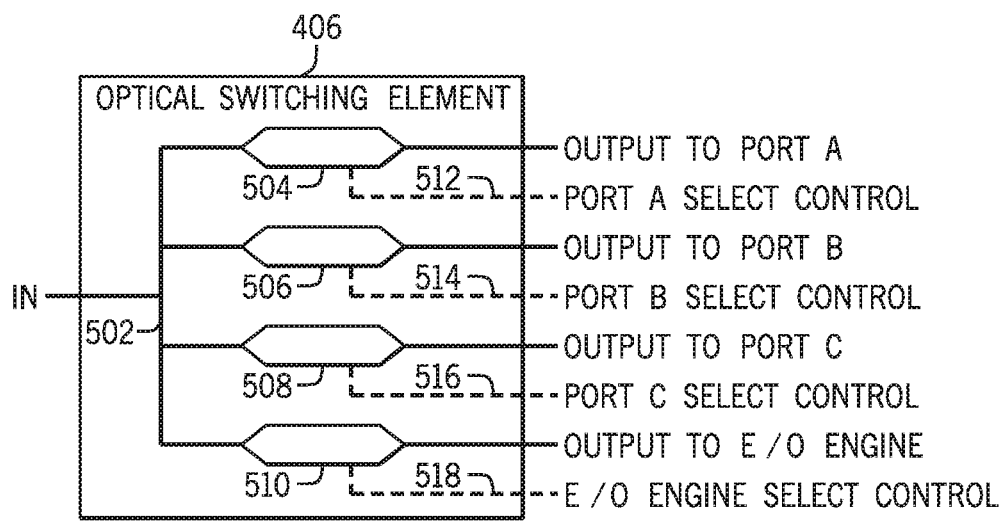
FIG. 5 is a block diagram of components in an optical switching element, according to further implementations.

FIG. 5 is a block diagram of an example optical switching element 406 that includes MZI elements 504, 506, 508, and 510, according to some implementations. An input optical signal (IN) is split by a splitter 502 to the multiple MZI elements 504, 506, 508, and 510.

Select control signals 512, 514, 516, and 518 (which are part of the control signals 219 from the control logic 218) are used to control the respective MZI elements 504, 506, 508, and 510. Each select control signal 512, 514, 516 or 518 controls whether the respective MZI element is to pass the input signal to the respective output.

By using the optical circuit switch 402 of FIG. 4, incoming data that is part of a circuit-switched communication does not have to be converted to the electrical domain. This can lead to reduced latency for circuit-switched communications.

The optical circuit switch 402 is an example of a monochromatic (or single-color) optical circuit switch. In alternative implementations, a multi-chromatic (or multi-color) optical circuit switch can be used.

Figure 6:
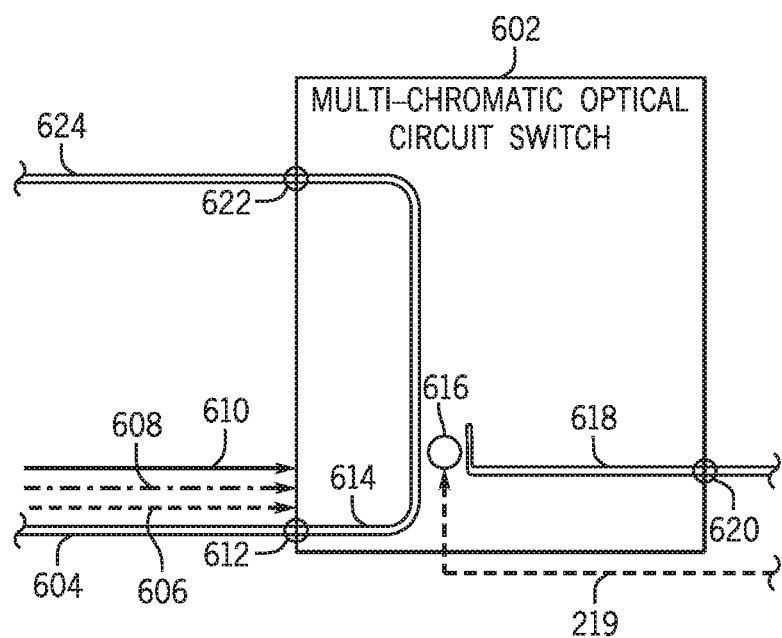
FIG. 6 is a block diagram of a multi-chromatic optical circuit switch device, according to alternative implementations.

FIG. 6 illustrates an example multi-chromatic optical circuit switch 602, which uses wavelength-division multiplexing (WDM) to multiplex each optical path (e.g. optical fiber or waveguide) into multiple wavelengths (multiple colors). The different wavelengths can be used for carrying different data. Effectively, if WDM is used, each optical path is divided (multiplexed) into multiple segments that correspond to the respective different wavelengths of light used to carry data, where the different segments can be used to carry different data in parallel. By using WDM, the overall bandwidth of an optical path can be increased, since each optical path can be used to carry different data in parallel. The total bandwidth of an optical path can be equal to a data rate multiplied by the number of colors (or number of distinct wavelengths used for carrying data).

An input optical path 604 carries input optical signals to an input optical port 612 of the multi-chromatic optical circuit switch 602. In the example of FIG. 6, it is assumed that WDM has been applied at the signal source to produce optical signals 606, 608, and 610 of respective different wavelengths that are carried along the input optical path 604. Although just three optical signals are depicted in FIG. 6, it is noted that more optical signals at other wavelengths can also be carried by the optical path 604.

An internal optical path 614 of the multi-chromatic optical circuit switch 602 is optically coupled to the input optical port 612. A microring resonator 616 is coupled to the internal optical path 614. The microring resonator 616 has a given resonance frequency; stated differently, the microring resonator 616 resonates at the given resonance frequency. An optical signal in the internal optical path 614 having a wavelength that corresponds to given resonance frequency is diverted by the microring resonator 616 to another optical path 618 in the multi-chromatic optical circuit switch 602. The optical path 618 directs the optical signal to a port 620 that is coupled to the E/O engine 410 of FIG. 4. The E/O engine 410 converts the optical signal from the optical path 618 into an electrical signal that is provided to the packet switch 216.

On the other hand, an optical signal in the internal optical path 614 having a wavelength that does not correspond to the given resonance frequency of the microring resonator 616 is allowed to continue to travel along the internal optical path 614 to an output optical port 622. This optical signal can continue to travel along an output optical path 624.

The resonance frequency of the microring resonator 616 can be tuned based on an electrical signal (that can be part of control signals 219 from the control logic 218). In some examples, the electrical signal can drive a resistor near the microring resonator to heat the microring resonator. In other examples, the electrical signal can drive carriers through the microring resonator. In each case, variation of the electrical signal can change the refractive index, and thus the resonance frequency, of the microring resonator. The adjustment of the resonance frequency of the microring resonator 616 can control whether an optical signal of a first wavelength is allowed to continue along the internal optical path 614 (for circuit switching), or is diverted by the microring resonator 616 to the optical path 618 (for packet switching).

Although just one microring resonator 616 is shown in FIG. 6, it is noted that there can be multiple microring resonators corresponding to the respective input optical signals (e.g. 606, 608, 610) of different wavelengths. For example, a first microring resonator can control whether an input optical signal of a first wavelength is to be passed along the internal optical path 614 or diverted to the optical path 618. Similarly, a second microring resonator can control whether an input optical signal of a second wavelength is to be passed along the internal optical path 614 or diverted to the optical path 618; a third microring resonator can control whether an input optical signal of a third wavelength is to be passed along the internal optical path 614 or diverted to the optical path 618; and so forth.

The resonance frequency of each of the microring resonators can be tuned by the control signals 219, such that the control logic 218 can control how each of the input optical signals is to be communicated.

Figure 7:
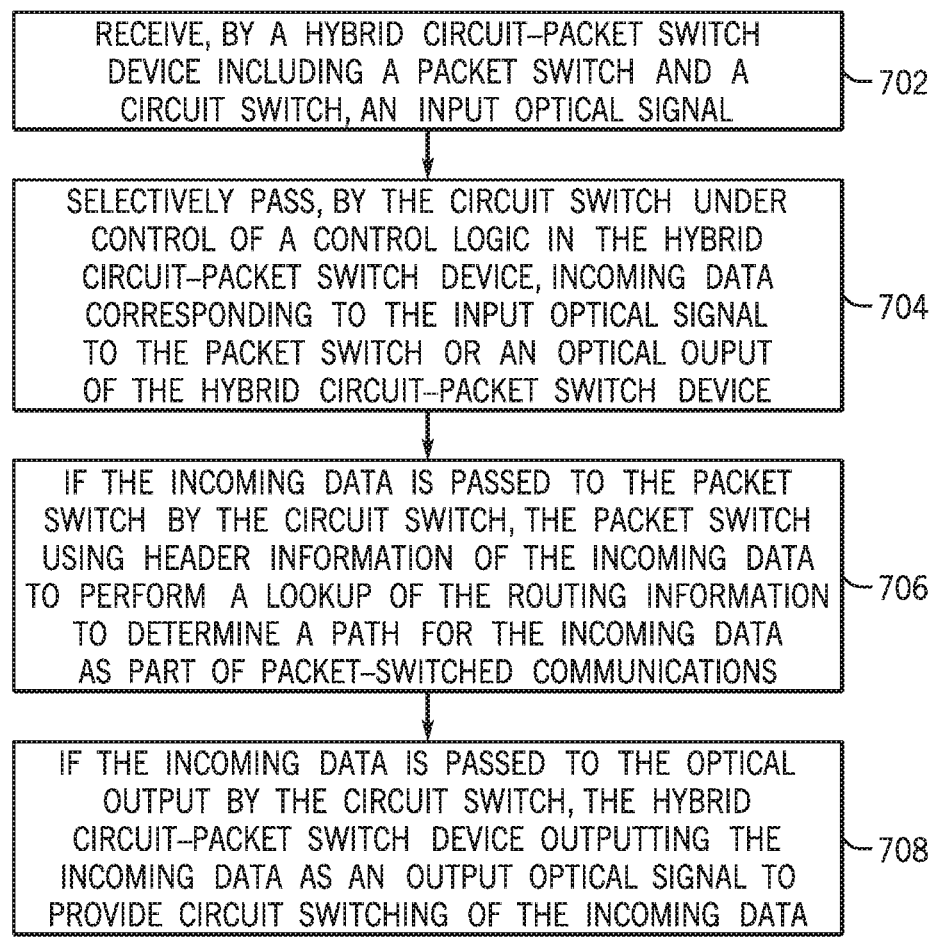
FIG. 7 is a flow diagram of a communication process according to some implementations.

FIG. 7 is a flow diagram of a communication process according to some implementations. The hybrid circuit-packet switch device 102 receives (at 702) an input optical signal. A circuit switch under control of control logic in the hybrid circuit-packet switch device selectively passes (at 704) incoming data corresponding to the input optical signal to the packet switch or an optical output of the hybrid circuit-packet switch device 102.

If the incoming data is passed to the packet switch by the circuit switch, the packet switch uses (at 706) header information of the incoming data to perform a lookup of routing information to determine a path for the incoming data as part of packet-switched communications.

If the incoming data is passed to the optical output by the circuit switch, the hybrid circuit-packet switch device 102 outputs (at 704) the incoming data as an output optical signal to provide circuit switching of the incoming data.

As noted above, the control logic 218 of FIG. 2 can include machine-readable instructions of modules executable on a processing circuitry.

The machine-readable instructions can be stored in one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A hybrid circuit-packet switch device comprising:
   a control logic;
   a packet switch; and
   a circuit switch to selectively pass, under control of the control logic, incoming data received at an optical input of the hybrid circuit-packet switch device to the packet switch or to an optical output of a plurality of optical outputs of the hybrid circuit-packet switch device, wherein the circuit switch includes an optical circuit switch, wherein the optical circuit switch includes switching elements controlled by the control logic, each of the switching elements to selectively couple an input to a respective one of plural outputs, a first of the plural outputs connected to the optical output of the hybrid circuit-packet switch device, and a second of the plural outputs connected to an input of an electrical-optical engine to convert between electrical and optical signals, wherein an output of the electrical-optical engine is connected to the packet switch,
   wherein selective passing of the incoming data to the optical output provides circuit switching of the incoming data, and
   wherein selective passing of the incoming data to the packet switch provides packet switching of the incoming data based on routing information accessible by the packet switch, wherein at least one of the plurality of optical outputs of the hybrid circuit-packet switch device is dynamically allocated to the packet switch via the control logic to output packet switched data.

2. The hybrid circuit-packet switch device of claim 1, further comprising optical inputs for coupling to optical paths, and the plurality of optical outputs for coupling to optical paths, wherein the optical paths for coupling to the optical inputs and the plurality of optical outputs are shared for circuit-switched communications and packet-switched communications.

3. The hybrid circuit-packet switch device of claim 1, wherein the circuit switch is to receive the incoming data without buffering of the incoming data in the hybrid circuit-packet switch device.

4. The hybrid circuit-packet switch device of claim 1, wherein the circuit switch is to selectively pass the incoming data to the packet switch or to the optical output without looking at any content of the incoming data.

5. The hybrid circuit-packet switch device of claim 1, wherein the control logic includes software-defined networking (SDN) logic.

6. The hybrid circuit-packet switch device of claim 5, wherein the SDN logic is to receive control information from a network management entity, the control information controlling how the incoming data is to be routed by the hybrid circuit-packet switch device.

7. The hybrid circuit-packet switch device of claim 1, wherein the circuit switch is an electronic switch, the hybrid circuit-packet switch device further comprising a photonic transceiver to:
   receive an input optical signal and to convert the input optical signal to the incoming data in electrical form, and
   convert output data from the circuit switch to an output optical signal for transmission from the hybrid circuit-packet switch device.

8. The hybrid circuit-packet switch device of claim 1, wherein the optical circuit switch includes Mach-Zehnder Interferometer (MZI) elements.

9. The hybrid circuit-packet switch device of claim 1, wherein the optical circuit switch is a multi-chromatic optical circuit switch that routes optical signals of different wavelengths produced using wavelength division multiplexing.

10. The hybrid circuit-packet switch device of claim 9, wherein the multi-chromatic optical circuit switch includes microring resonators to selectively pass each of the optical signals to the packet switch or to the optical output of the hybrid circuit-packet switch device.

11. A system comprising:
    a network management entity; and
    a plurality of hybrid circuit-packet switch devices, each of the hybrid circuit-packet switch devices comprising:
       a control logic to receive control information from the network management entity relating to routing of input optical signals received by the hybrid circuit-packet switch device;
       a packet switch; and
       a circuit switch to selectively pass, under control of the control logic, incoming data corresponding to an input optical signal received at an optical input of the hybrid circuit-packet switch to the packet switch or to an optical output of a plurality of optical outputs of the hybrid circuit-packet switch device, wherein the circuit switch includes an optical circuit switch, wherein the optical circuit switch includes switching elements controlled by the control logic, each of the switching elements to selectively couple an input to a respective one of plural outputs, a first of the plural outputs connected to the optical output of the hybrid circuit-packet switch device, and a second of the plural outputs connected to an input of an electrical-optical engine to convert between electrical and optical signals, wherein an output of the electrical-optical engine is connected to the packet switch,
       wherein selective passing of the incoming data to the optical output provides circuit switching of the incoming data, and
       wherein selective passing of the incoming data to the packet switch provides packet switching of the incoming data based on routing information accessible by the packet switch, wherein at least one of the plurality of optical outputs of the hybrid circuit-packet switch device is dynamically allocated to the packet switch via the control logic to output packet switched data.

12. A method comprising;

receiving, by a hybrid circuit-packet switch device including a packet switch and a circuit switch, an input optical signal, wherein the circuit switch includes an optical circuit switch, wherein the optical circuit switch includes switching elements controlled by the control logic, each of the switching elements to selectively couple an input to a respective one of plural outputs, a first of the plural outputs connected to the optical output of the hybrid circuit-packet switch device, and a second of the plural outputs connected to an input of an electrical-optical engine to convert between electrical and optical signals, wherein an output of the electrical-optical engine is connected to the packet switch;

selectively passing, by the circuit switch under control of a control logic in the hybrid circuit-packet switch device, incoming data corresponding to the input optical signal to the packet switch or to an optical output of a plurality of optical outputs of the hybrid circuit-packet switch device;

if the incoming data is passed to the packet switch by the circuit switch, the packet switch using header information of the incoming data to perform a lookup of routing information to determine a path for the incoming data as part of packet-switched communications, wherein the path comprises at least one of the plurality of optical outputs of the hybrid circuit-packet switch device that is dynamically allocated to the packet switch via the control logic to output packet switched data; and if the incoming data is passed to the optical output by the circuit switch, the hybrid circuit-packet switch device outputting the incoming data as an output optical signal to provide circuit switching of the incoming data.

* * * * *